(12) United States Patent
Kato et al.

(10) Patent No.: US 8,042,386 B2
(45) Date of Patent: Oct. 25, 2011

(54) TEST SECTION FOR WIND-TUNNEL TESTING APPARATUS AND WIND TUNNEL TEST APPARATUS EMPLOYING THE SAME

(75) Inventors: Hidehiko Kato, Nagoya (JP); Tomohiro Sone, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 42 days.

(21) Appl. No.: 12/602,826

(22) PCT Filed: Jul. 24, 2008

(86) PCT No.: PCT/JP2008/063239
§ 371 (c)(1),
(2), (4) Date: Dec. 3, 2009

(87) PCT Pub. No.: WO2009/037917
PCT Pub. Date: Mar. 26, 2009

(65) Prior Publication Data
US 2010/0175465 A1 Jul. 15, 2010

(30) Foreign Application Priority Data
Sep. 20, 2007 (JP) ................. 2007-244396

(51) Int. Cl.
*G01M 9/00* (2006.01)
(52) U.S. Cl. ........................................ 73/147
(58) Field of Classification Search .......... None
See application file for complete search history.

(56) References Cited

U.S. PATENT DOCUMENTS

| | | | | |
|---|---|---|---|---|
| 3,782,189 | A * | 1/1974 | Evans ........................ | 73/147 |
| 3,853,003 | A * | 12/1974 | Sorensen .................... | 73/147 |
| 6,588,287 | B2 | 7/2003 | Gleason et al. | |
| 2002/0088276 | A1* | 7/2002 | Omotani et al. ............ | 73/147 |
| 2009/0133246 | A1* | 5/2009 | De Pablo Perez .......... | 29/700 |

FOREIGN PATENT DOCUMENTS

| | | |
|---|---|---|
| DE | 100 37 928 | 4/2001 |
| EP | 1 671 707 | 6/2006 |
| JP | 61-76929 | 4/1986 |

(Continued)

OTHER PUBLICATIONS

International Search Report issued Oct. 28, 2008 in International (PCT) Application No. PCT/JP2008/063239.

(Continued)

*Primary Examiner* — Andre Allen
(74) *Attorney, Agent, or Firm* — Wenderoth, Lind & Ponack, L.L.P.

(57) ABSTRACT

A test section for a wind-tunnel testing apparatus has a mounting section that mounts an automobile along the internal floor surface of a wind tunnel. Tests are conducted by applying an airflow blown in the wind tunnel to the automobile mounted on the mounting section. The test section includes a slit that is disposed on the floor surface located on the upstream side of the mounting section with respect to the airflow direction so as to extend in the intersecting direction intersecting the airflow direction and that sucks in a portion of the airflow near the floor surface, and lateral suction portions, disposed at both sides of the mounting section, that suck in the incoming airflows R flowing in from the sides of the mounting section.

6 Claims, 5 Drawing Sheets

FOREIGN PATENT DOCUMENTS

| | | | |
|---|---|---|---|
| JP | 1-145542 | | 6/1989 |
| JP | 02080934 A | * | 3/1990 |
| JP | 5-248986 | | 9/1993 |
| JP | 06003218 A | * | 1/1994 |
| JP | 6-341920 | | 12/1994 |
| JP | 7-225176 | | 8/1995 |
| JP | 11-509926 | | 8/1999 |
| JP | 11311586 A | * | 11/1999 |
| JP | 2006-170639 | | 6/2006 |
| WO | 03/071248 | | 8/2003 |
| WO | 2007/141639 | | 12/2007 |

OTHER PUBLICATIONS

Yuji Ishihara, "Aerodynamic Development of Passenger Cars using a Wind Tunnel with Moving Belt Equipment", Jidosha Gijutsu, Apr. 1, 2003, vol. 57, No. 4, pp. 19-24, with Abstract on first page.

* cited by examiner

TEST SECTION FOR WIND-TUNNEL TESTING APPARATUS AND WIND TUNNEL TEST APPARATUS EMPLOYING THE SAME

BACKGROUND OF THE INVENTION

I. Technical Field

The present invention relates to a testing section for a wind-tunnel testing apparatus and to a wind-tunnel testing apparatus employing the same.

II. Description of the Related Art

A wind-tunnel testing apparatus is generally used when evaluating aerodynamic forces on automobiles or airplanes. In particular, when evaluating aerodynamic forces including effects of the ground surface, as in vehicles such as automobiles, etc., a wind tunnel test is carried out by mounting a vehicle on a moving belt that serves as the ground surface for simulated traveling and by driving the moving belt in accordance with the airflow velocity, that is, the traveling velocity of the vehicle (see Japanese Unexamined Patent Application, Publication No. Hei 6-341920, Japanese Unexamined Patent Application, Publication No. 2006-170639 and Japanese Unexamined Patent Application, Publication No. Hei 5-248986).

DISCLOSURE OF INVENTION

Because the ones disclosed in Japanese Unexamined Patent Application, Publication No. Hei 6-341920 and Japanese Unexamined Patent Application, Publication No. 2006-170639 employ support pillars and/or wires to secure a vehicle, the measured aerodynamic forces include their influences.

In addition, a low velocity boundary layer forms near a floor surface due to the frictional resistance between the airflow and the floor surface, and airflows enter from the sides of the vehicle; however, these are not taken into consideration.

Therefore, with the disclosures in Japanese Unexamined Patent Application, Publication No. Hei 6-341920 and Japanese Unexamined Patent Application, Publication No. 2006-170639, it is not possible to measure the actual aerodynamic forces acting on the vehicle.

Alterations to attach support pillars, wires, etc. are necessary. In addition, because the moving belt is wide, in order to simulate the ground surface, it is necessary to provide holding members to suppress vertical fluctuations. Accordingly, resistance to traveling becomes large, and a large driving force, that is, large driving means, becomes necessary.

Therefore, manufacturing costs and testing costs increase, and testing efficiency decreases.

The disclosure in Japanese Unexamined Patent Application, Publication No. Hei 5-248986 is provided with walls at both sides of a moving belt for guiding airflows, thereby preventing the airflows that laterally enter the moving belt having an influence on the measurements.

However, low velocity boundary layers are formed on side surfaces along the walls due to the frictional resistance with the walls, and there is also an influence of the boundary layer near the floor surface; therefore that approach was not adequate for measuring the actual aerodynamic forces.

SUMMARY OF THE INVENTION

The present invention has been conceived in light of the above-described situations, and an object thereof is to provide a test section for a wind-tunnel testing apparatus and a wind-tunnel testing apparatus employing the same that are capable of measuring aerodynamic forces closer to the those actually occurring by suppressing the influences of a floor boundary layer and laterally incoming airflows.

A vehicle wind-tunnel testing method and apparatus that are capable of simulating an actual driving test are achieved.

In order to solve the above-described problems, the present invention employs the following solutions.

A first aspect of the present invention is a test section for a wind-tunnel testing apparatus having a mounting section that mounts a test object along an internal floor surface of the wind tunnel, tests being conducted by applying an airflow blown in the wind tunnel to the test object mounted on the mounting section, the test section for a wind-tunnel testing apparatus including an upstream-side suction portion that is disposed on the floor surface located on the upstream side of the mounting portion with respect to the airflow direction so as to extend in the intersecting direction intersecting the airflow direction and that sucks in a portion of the airflow near the floor surface; and lateral suction portions, disposed at both sides of the mounting section, that suck in the incoming airflows flowing in from the sides of the mounting section.

With this aspect, because the upstream-side suction portion is provided at the upstream side of the mounting section with respect to the airflow direction, so as to extend in an intersecting direction that intersects with the airflow direction, the suction of the upstream-side suction portion makes it possible to suck in a portion of the airflow blown into the mounting section near the floor surface.

Accordingly, because the upstream-side suction portion sucks in a boundary layer that is formed near the floor surface due to the friction between the wind tunnel floor surface and the airflow blowing into the mounting section and whose the airflow velocity is lower than a predetermined velocity, it is possible to provide the test object in the mounting section with an airflow having a substantially uniform velocity distribution extending to the floor surface. In other words, the boundary layer near the floor surface is accelerated by the suction of the upstream-side suction portion, and thus, the predetermined airflow velocity is restored; therefore, it is possible to provide the test object in the mounting section with an airflow having a velocity distribution substantially uniform in the height direction.

In addition, because lateral suction portions disposed at both sides of the mounting section suck in incoming airflows flowing in from the sides of the mounting section, it is possible to suppress the influence of the incoming airflows flowing in from the sides.

Accordingly, it is possible to provide the test object with a substantially uniform airflow, and therefore, it is possible to measure aerodynamic forces closer to those that actually act on the test object.

In addition, with the above-described aspect, the mounting section is provided with a plurality of endless belts, disposed with distances therebetween in the intersecting direction, that are revolvingly driven in a direction substantially perpendicular to the intersecting direction; suction portions, disposed between adjacent endless belts, that suck in the airflow; and supporting portions, installed in the suction portions, that support ground contact portions of the test object.

With this configuration, the mounting section is constituted of the endless belts, the suction portions, and the lateral suction portions. By having the top surfaces thereof driven at a velocity substantially equal to the airflow, a plurality of the endless belts can eliminate the influence of the floor on the airflow. In addition, because the suction portions suck in boundary layers formed upon entering the suction portions, it is possible to suppress the formation of the boundary layers.

Accordingly, it is possible to provide the test object with a substantially uniform airflow, and therefore, it is possible to measure aerodynamic forces closer to those that actually act on the test object.

In addition, because the endless belts are divided into a plurality of belts, it is possible to make the widths of individual endless belts small. When the widths of the endless belts are made small, the behavior thereof can be easily controlled; therefore, holding members for suppressing the fluctuations in the vertical direction need not be employed. Accordingly, because the endless belts can be easily moved, small driving means is sufficient, and therefore, it is possible to have a simple structure and low manufacturing costs.

Furthermore, because the supporting portions, which support the ground contact portions of the test object, are installed on stationary suction portions, it is not necessary to install members for supporting the test object, that is, support pillars, wires, etc., in portions that come in contact with the airflow.

Accordingly, because the airflow has no contact with members other than the test object, it is possible to measure aerodynamic forces even closer to those that actually act on the test object.

In addition, with the above-described aspect, it is desirable that the supporting portions be rotatable.

In addition, with the above-described aspect, it is desirable that the supporting portions be constituted of revolvingly driven endless belts.

By doing so, wind-tunnel testing of automobiles, railroad vehicles, etc. can be favorably carried out.

In addition, with the above-described aspect, the supporting portions may be provided with a balance apparatus that measures a load acting on the supporting portions.

A second aspect of the present invention provides a wind-tunnel testing apparatus including a test section according to the above-described first aspect, a blower that generates an airflow; and a wind tunnel that guides the airflow to the test section.

With this aspect, because the test section that can provide the test object with a substantially uniform airflow is employed, it is possible to measure aerodynamic forces closer to those that actually act on the test object.

With the present invention, because the upstream-side suction portion, which is disposed on the floor surface located on the upstream side of the mounting section with respect to the airflow direction so as to extend in the intersecting direction that intersects the airflow direction and that sucks in the portion of the airflow near the floor surface, and the lateral suction portions, which are disposed at both sides of the mounting section and that suck in the incoming airflows flowing into the mounting section from the sides thereof, are provided, it is possible to provide the test subject with a substantially uniform airflow and to measure aerodynamic forces closer to those that actually act on the test object.

DETAILED DESCRIPTION OF THE INVENTION

A wind-tunnel testing apparatus 1 according an embodiment of the present invention will be described below, referring to FIGS. 1 to 6. This wind-tunnel testing apparatus 1 will be described in terms of one used for measuring the aerodynamic force on an automobile.

Figure 1:
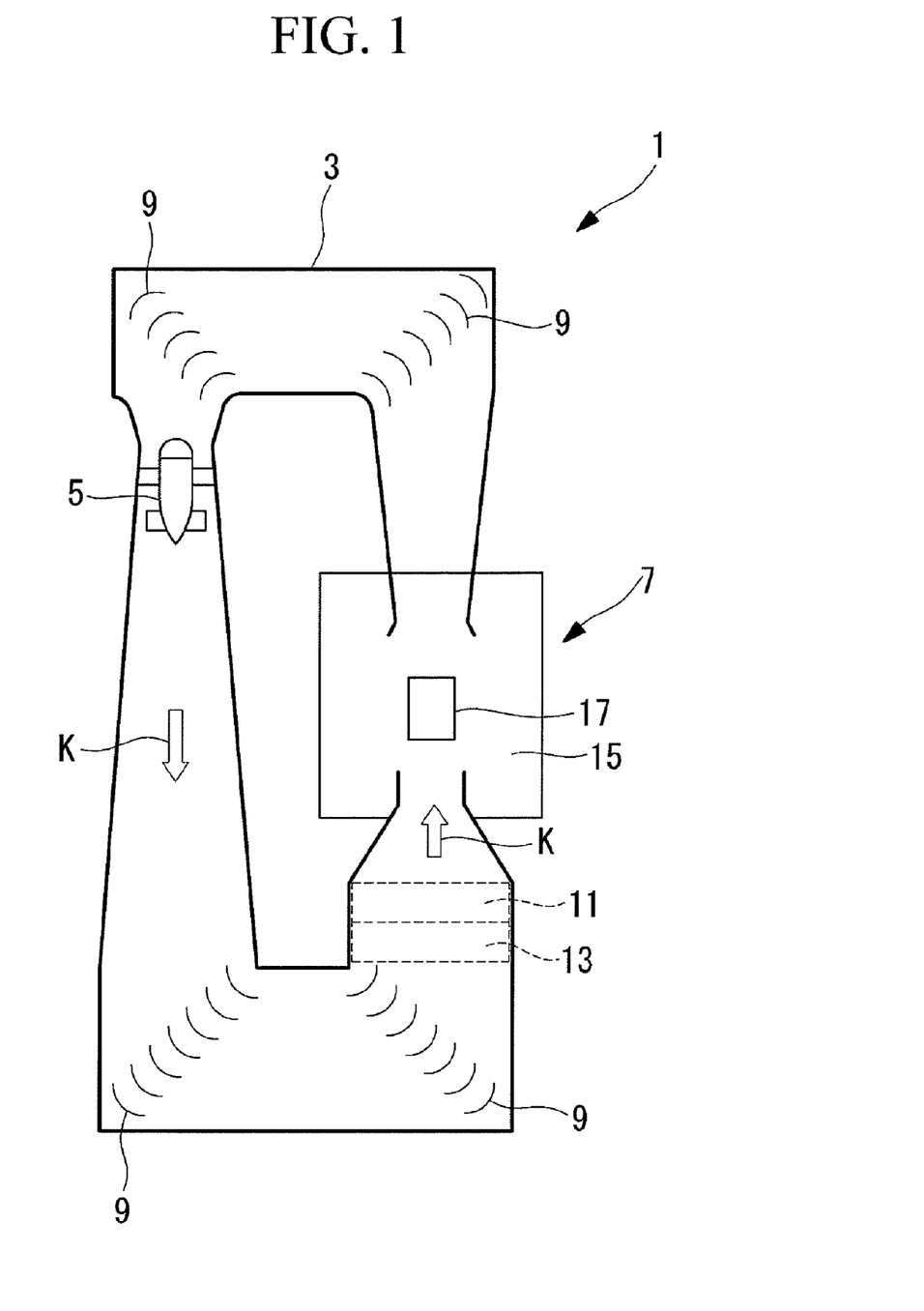
FIG. 1 is a schematic view showing, in outline, the configuration of a wind-tunnel testing apparatus according to an embodiment of the present invention.
Figure 2:
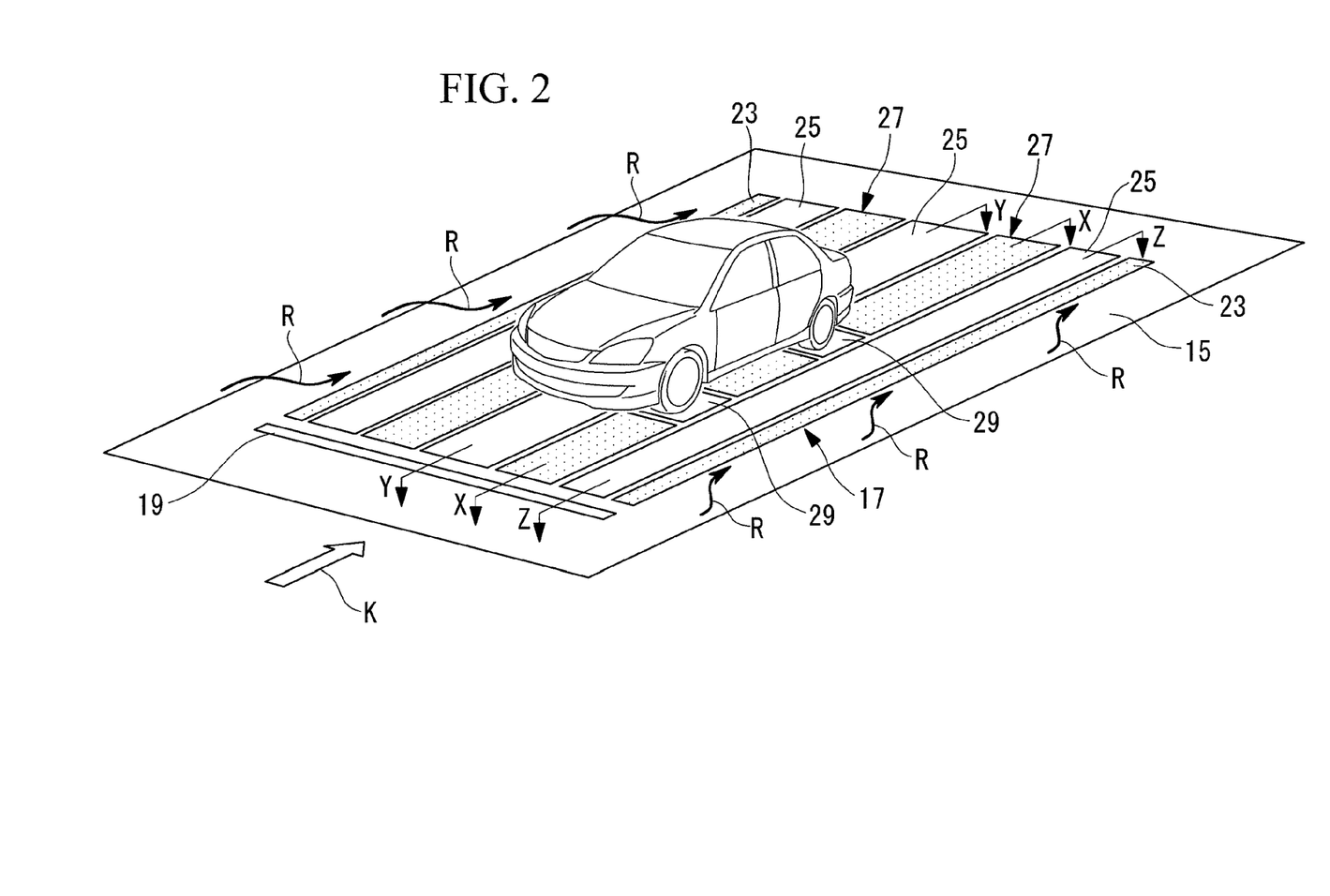
FIG. 2 is a perspective view showing a mounting section according to an embodiment of the present invention.
Figure 3:
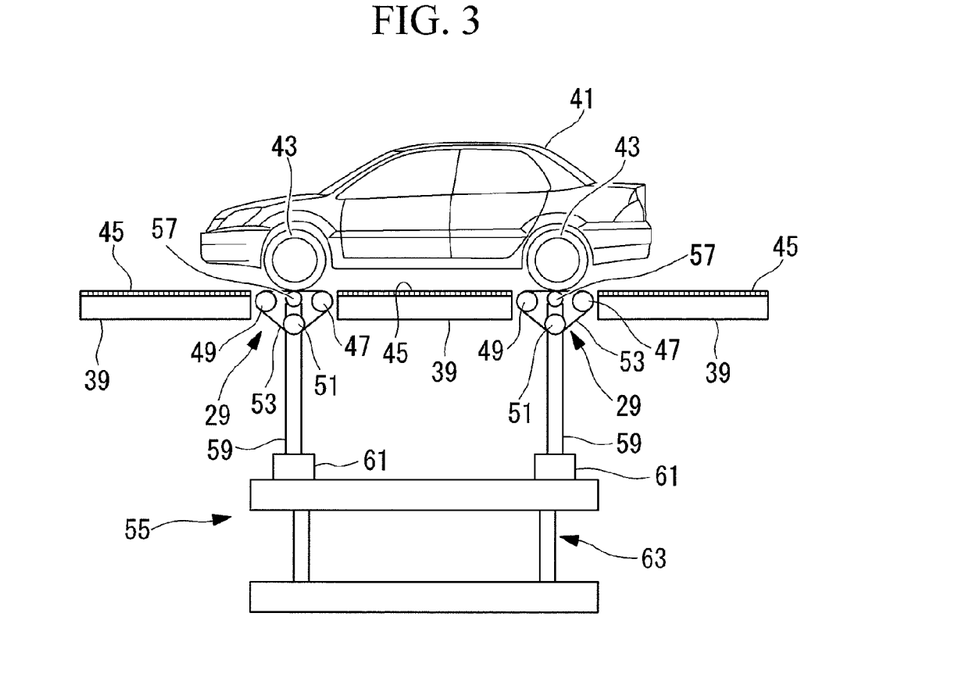
FIG. 3 is a sectional view of FIG. 2 taken along X-X.
Figure 4:
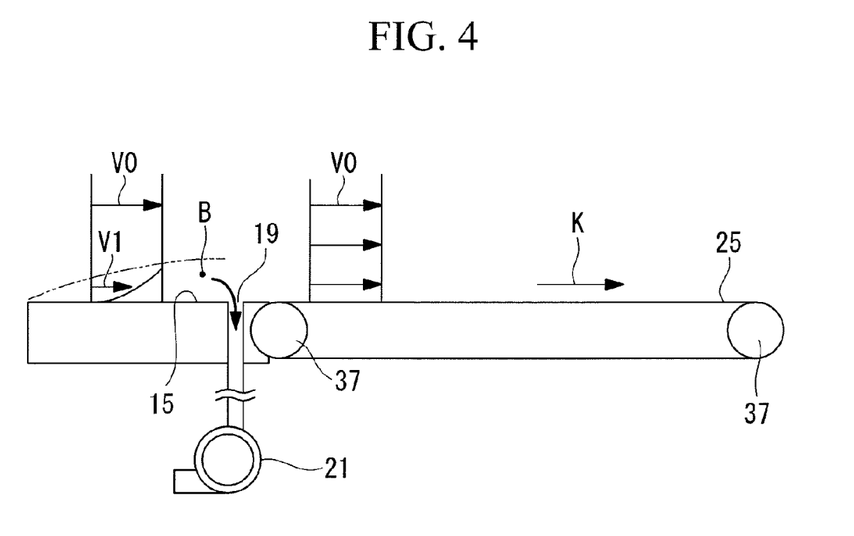
FIG. 4 is a sectional view of FIG. 2 taken along Y-Y.
Figure 5:
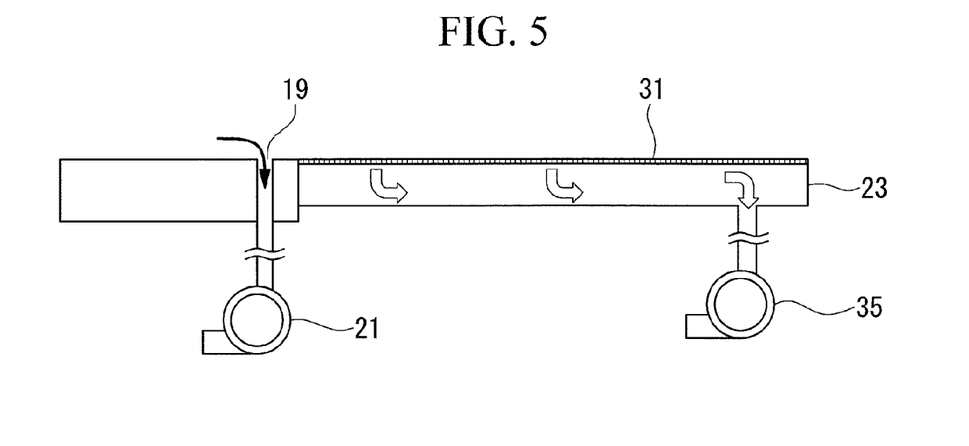
FIG. 5 is a sectional view of FIG. 2 taken along Z-Z.
Figure 6:
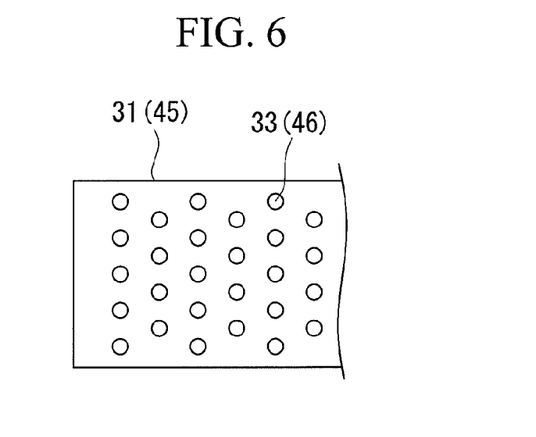
FIG. 6 is a partial plan view showing a top plate according to an embodiment of the present invention.

FIG. 1 is a schematic view showing, in outline, the configuration of the wind-tunnel testing apparatus 1 according to this embodiment. FIG. 2 is a perspective view showing a mounting section 17 according to this embodiment. FIG. 3 is a sectional view of FIG. 2 taken along X-X. FIG. 4 is a sectional view of FIG. 2 taken along Y-Y. FIG. 5 is a sectional view of FIG. 2 taken along Z-Z. FIG. 6 is a partial plan view showing a top plate according to this embodiment.

The wind-tunnel testing apparatus 1 is provided with a wind tunnel 3, a blower 5, and a test chamber (test section) 7.

The wind tunnel 3 is an endless structure formed in a substantially rectangular form in plan view. Corner portions of the wind tunnel 3 are provided with a plurality of corner vanes 9 that alter the direction of the airflow.

The blower 5 is internally mounted in a portion of the wind tunnel 3 and has a function of making an airflow flow in the wind tunnel 3. The rotational speed of the blower 5 can be freely adjusted, and thereby, the velocity of the airflow flowing in the wind tunnel 3 can be arbitrarily changed.

A rectifying section 11 that rectifies the flow of the airflow and a heat exchanging section 13 that adjusts the temperature of the airflow are provided in the wind tunnel 3, on the upstream side of the test chamber 7 with respect to the airflow direction K.

The test chamber 7 is provided so as to cover a portion of the wind tunnel 3. The mounting section 17, for mounting an automobile in the airflow passageway, is provided on a floor surface 15 of the test chamber 7.

As shown in FIG. 1, the mounting section 17 is mounted so that short side portions thereof extend in a direction substantially perpendicular to the airflow direction K (in other words, the intersecting direction that intersects the airflow direction K, also referred to as the width direction hereafter) and is substantially rectangular in plan view.

A slit (upstream-side suction portion) 19 is provided on the floor surface 15 on the upstream side of the mounting section 17 with respect to the airflow direction K, extending in a direction substantially perpendicular to the airflow direction K (in other words, the intersecting direction that intersects the airflow direction K).

The slit 19 is connected to a suction pump 21 and has a function of sucking in the air on the floor surface 15 by operation of the suction pump 21.

The mounting section 17 is provided with lateral suction portions 23 that constitute the long side portions at both sides thereof, three endless moving belts (endless belts) 25, suction portions 27 disposed between the adjacent moving belts 25, and supporting portions 29 disposed at intermediate positions of the suction portions 27.

As shown in FIG. 5, the lateral suction portions 23 have a box structure having a rectangular form. As shown in FIG. 6, top plates 31, which constitute the top surfaces of the lateral suction portions 23, are provided with a large number of through-holes 33. The through-holes 33 are disposed in a staggered manner over substantially the entire surfaces of the top plates 31.

The hollow portions of the lateral suction portions 23 are connected to a suction pump 35, having a function of sucking in the air on the top plates 31 by operating the suction pump 35.

The moving belts 25 are endless belt members that are engaged with a pair of rollers 37 whose axial centers extend in the directions along both short side portions of the mounting section 17. The top surfaces of the moving belts 25 move in the airflow direction K by having an unillustrated driving source rotationally drive one of the rollers 37. The driving source can freely adjust the rotating velocity of the rollers 37, and thereby, the moving velocity of the moving belts 25 can be arbitrarily changed.

The three endless belts 25 are installed in two positions adjacent to the lateral suction portions 23 and an intermediate position therebetween. Because the moving belts 25 are divided in the width direction in this way, the width thereof can be made small. Accordingly, because their behaviors can be easily controlled, eliminating the need for holding members, conventionally provided for suppressing fluctuations in the vertical direction, the resistance exerted on the moving belts 25 can be made small. Accordingly, because the moving belts 25 can easily move, a small driving source is sufficient, and it is possible to have a simple structure and low manufacturing costs.

The suction portions 27 are disposed over substantially the same length as the moving belts 25 and are provided with suction boxes 39 and supporting portions 29.

The supporting portions 29 support tires (ground contact portions) 43 of an automobile (test object) 41 and are provided at two locations having a gap therebetween in the airflow direction K and coinciding with the two suction portions 27, for a total of four locations.

As shown in FIG. 3, the suction boxes 39 are provided at three locations flanking each supporting portion 29 and coinciding with the two suction portions 27, for a total of six locations.

The suction boxes 39 have a box structure of a rectangular form, and portions thereof are connected to an unillustrated suction pump.

As shown in FIG. 6, top plates 45 that constitute the top surfaces of the suction boxes 39 are provided with a large number of through-holes 46. The through-holes 46 are disposed in a staggered manner over substantially the entire surfaces of the top plates 45.

The suction boxes 39 have a function of sucking in the air on the top plates 45 by operating the suction pump.

The supporting portions 29 are provided with driving rollers 47, guiding rollers 49, adjusting rollers 51, and belt members 53. The belt members 53 are engaged with the driving rollers 47, the guiding rollers 49, and the adjusting rollers 51.

The driving rollers 47, the guiding rollers 49, and the adjusting rollers 51 are disposed so that the axial centers extend in substantially the lateral direction. The driving rollers 47, the guiding rollers 49, and the adjusting rollers 51 form the top traveling pathways of the belt members 53.

The driving rollers 47 are rotationally driven by an unillustrated driving source. The driving source can freely adjust the rotating velocity of the driving rollers 47, and thereby, the moving velocity of the belt members 53 can be arbitrarily changed.

The adjusting rollers 51 are mounted so as to be movable in the vertical direction and are configured so as to adjust the tension of the belt members 53 by moving in the vertical direction.

A balance apparatus 55 is provided below the supporting portions 29. The balance apparatus 55 is provided with four receiving rollers 57 that receive each tire 43, four support pillars 59 that support each receiving roller 57, four load cells 59 that measure the distortion of each support pillar 59, and a base 63 that supports all of the support pillars 59.

The support pillars 59 are deformed (distorted) by the force exerted on the receiving rollers 57 by the tires 43. The load cells 61 are configured to measure the amount of distortion of the support pillars 59 and to calculate forces exerted on each tire 43.

Because the base 63 deforms upon receiving forces from each support pillar 59, the configuration thereof is such that the amount of deformation is measured and the force exerted on the entire automobile 41 is calculated.

The aperture ratio of the through-holes 33, that is, the proportion of the total area of all of the through-holes 33 relative to the areas of the top plates 31, is set to be, for example, 5 to 6%. In addition, the aperture ratio of the through-holes 46, that is, the proportion of the total area of all of the through-holes 46 relative to the areas of the top plates 45, is set to be, for example, 5 to 6%.

These aperture ratios are set to be small because only boundary layers formed after entering the mounting section 17 should be sucked in, assuming that the boundary layers entering the mounting section 17 are mainly sucked in by the slit 19. Accordingly, the suction level may be set to be greater toward the downstream side where more boundary layers occur.

Note that the aperture ratios can be set to appropriate values as needed.

Figure 7:
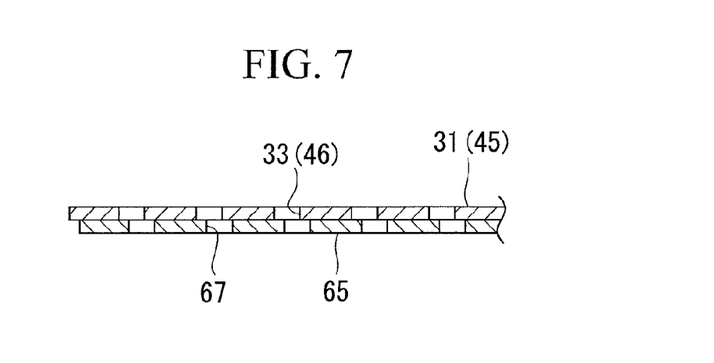
FIG. 7 is a partial longitudinal sectional view showing another form of a top plate according to an embodiment of the present invention.
Figure 8:
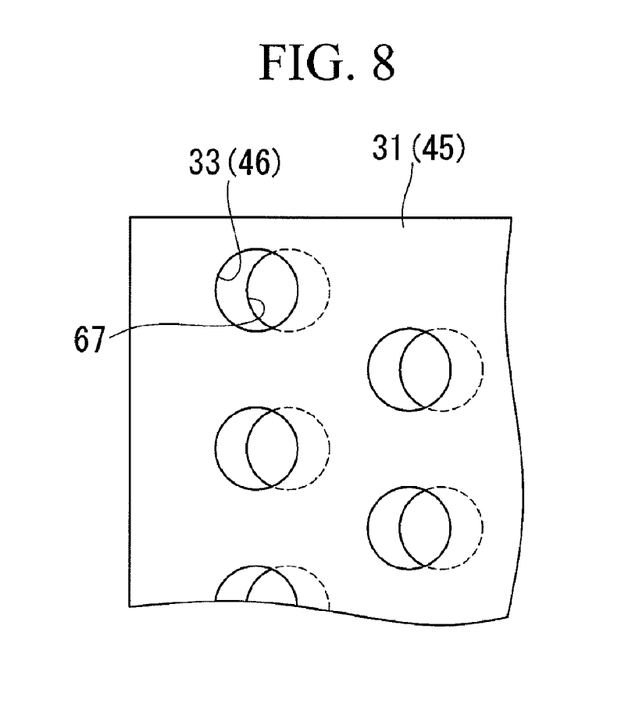
FIG. 8 is a partial plan view of FIG. 7.

In addition, as shown in FIGS. 7 and 8, adjusting plates 65, having through-holes 67 whose position and size are substantially equal to those of the through-holes 33 and 46, may be provided slidably with respect to the top plates 31 and and inside of the top plates 31 and 45, so that the aperture ratios can be adjusted.

By making the adjusting plates 65 slidable with respect to the top plates 31 and 45, overlapping portions between the through-holes 33 and 46 and the through-holes 67, that is, the area of the apertures, can be adjusted.

In this case, by making the aperture areas of the through-holes 33 and 45 and the through-holes 67 large, the aperture ratios can be adjusted to appropriate values in accordance with the airflow velocity, the suction level at the slit 19, etc.

Figure 9:
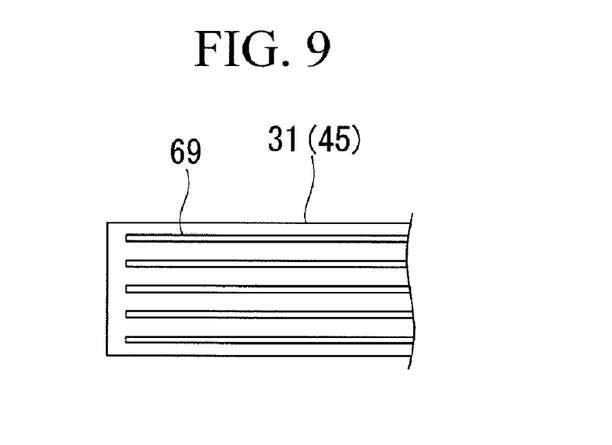
FIG. 9 is a partial plan view of yet another form of a top plate according to an embodiment of the present invention.

The through-holes 33 and 46 are not limited to a circular shape and may be formed in any appropriate shape. As shown in FIG. 9, for example, the through-holes 33 and 46 may be long, narrow slits 69, parallel to the airflow direction K.

The measuring operation of the above-described wind-tunnel testing apparatus 1 will be described.

First, the settings of each part are adjusted in accordance with the type of test. Then, the blower 5 is operated to generate an airflow having a predetermined velocity V0, for example, 100 km/h, in the wind tunnel 3. Because the airflow comes in contact with the wall surfaces of the wind tunnel 3, for example, the floor surface 15, and experiences frictional resistance, a boundary layer B, a region of lower velocity V1 than the predetermined velocity V0, is formed near the wall surfaces (see FIG. 4).

In this state, the flow rate of the boundary layer B at the slit 19 portion is measured using, for example, a pitot tube. If there is one installed in the wind tunnel 3, the existing pitot tube is used, and if there is none suitable, one is appropriately installed.

Based on this measured flow rate of the boundary layer B, the suction level of the suction pump 21 is adjusted so that the airflow of the boundary layer B is sucked in from the slit 19.

The blower 5 is halted, and the automobile 41 is carried into the test chamber. As shown in FIGS. 2 and 3, the automobile 41 is mounted such that individual tires 43 are supported by the supporting portions 29. Positioning and mounting are carried out so as to have the tires supported by the receiving rollers 57 of the balance apparatus 55.

The blower 5 is operated in this state to increase the airflow velocity to the predetermined velocity V0. At this time, the moving belts 25 and the belt members 53 are driven at an appropriate timing so as to make the top surfaces thereof move in the airflow direction K at the predetermined velocity V0.

The tires 43 are rotated by these belt members 53.

The suction pump 21 is operated so as to suck in the airflow near the floor surface 15 from the slit 19. The suction pump 35 is operated so as to suck in the airflow above the lateral suction portions 23 from the through-holes 33 in the lateral suction portions 23. The unillustrated suction pump is operated so as to suck in the airflow above the suction boxes 39 from the through-holes 46 in the suction boxes 39.

Once the operation of each part becomes a predetermined state in this way, the measurement of aerodynamic forces exerted on the automobile 41 is initiated.

The airflow generated by the blower 5 passes through inside the wind tunnel 3, is adjusted to a predetermined temperature in the heat exchanging section 13, is rectified in the rectifying section 11, and is introduced into the mounting section 17 at the predetermined velocity V0 set in advance.

At this time, the airflow experiences friction due to contact with the floor surface 15, and a boundary layer B, a region where the velocity V1 is lower than the predetermined velocity V0, is formed near the floor surface 15. As shown in FIG. 4, the boundary layer B becomes thicker as the contact area with the floor surface 15 becomes longer.

Because the slit 19 sucks in the decelerated airflow near the floor surface 15 immediately before entering the mounting section 17, the air pressure near the slit 19 decreases, that is, negative pressure is generated. When negative pressure is generated near the slit 19, the peripheral air, that is, the air forming the boundary layer B, flows in, in order to make the air pressure uniform. In other words, the air in the boundary layer B is pulled towards the slit 19, thereby being accelerated. Because the slit 19 is constantly sucking in the air, this action is continuously carried out.

In this way, the airflow of the boundary layer B is sucked in by the slit 19, and the airflow enters a state having the predetermined velocity V0 that is substantially uniform in the vertical direction, and is introduced into the mounting section 17.

When a high-speed airflow passes through the mounting section 17, it is pulled by this airflow, and the decelerated flows, developed in the lateral directions of the mounting section 17, flow into the mounting section 17.

Because the lateral suction portions 23, disposed at both sides of the mounting section 17, suck in the incoming airflows R that flow in from the lateral directions of the mounting section 17, it is possible to suppress the influences of the incoming airflows R on the airflow.

Of the airflow introduced into the mounting section 17, in the portion passing above the moving belts 25, friction is not generated between the airflow and the moving belts 25 because the moving belts 25 are moving at a velocity substantially equal to the predetermined velocity V0.

Accordingly, as shown in FIG. 4, the airflow above the moving belts 25 moves in a state having the predetermined velocity V0 that is substantially uniform in the vertical direction.

On the other hand, the airflow passing above the suction portions 27, excluding the supporting portions 29 where the belt surfaces are moving at a velocity substantially equal to the airflow, comes in contact with the surfaces of the top plates 45 of the fixed suction boxes 39; therefore, friction occurs between the two, thereby generating boundary layers B.

Because the airflow passing above the top plates 45 of the suction boxes 39 is constantly sucked in from the through-holes 45 over substantially the entire length thereof, the generated boundary layers B are sucked in from the through-holes 36 while remaining thin. Accordingly, because the boundary layers B do not increase in size, as shown in FIG. 4, the airflow above the suction portions 27 moves in a state having a predetermined velocity V0 that is substantially uniform in the vertical direction.

Note that, because a boundary layer B becomes thicker toward the downstream side, in order to reliably suck in the boundary layer B, the suction level at the suction boxes 39 may be increased toward the downstream side.

Because the tires 43 of the automobiles 41 are supported by the supporting portions 29, members for supporting the automobiles 41, for example, support pillars, wires, etc., need not be employed above the floor surface.

Because the belt members 53 that support the tires 43 are moving at a velocity substantially equal to the airflow, friction with the airflow is not generated. In this way, the supporting portions 29 do not disturb the passing airflow.

Because an airflow having substantially uniform velocity distribution with respect to the automobile 41 mounted on the mounting section 17 can be provided, it is possible to precisely measure aerodynamic forces that act on the automobile 41 under conditions closer to those actually occurring.

When an airflow that is substantially uniform acts on the automobile 41, positive pressure portions, where the pressure is higher than the standard, and negative pressure portions, where the pressure is lower than the standard, are formed on the automobile 41. The pressure differences between the positive pressure portions and the negative pressure portions form aerodynamic forces that act on the automobile 41. The automobile 41 is pushed upward or pushed down by the aerodynamic forces.

The load that acts on each receiving roller 57 fluctuates due to such fluctuations in the vertical direction as a result of inclination of the automobile 41.

The load exerted on the receiving rollers 57 is transmitted to the support pillars 59, and the load cells 61 measure the amount of distortion; thereby, the load exerted on the support pillars 59, that is, the aerodynamic forces transmitted from the tires 43, can be measured. Each load cell 61 can measure the aerodynamic forces transmitted to each tire 43.

Because the base 63 supports all of the support pillars, the aerodynamic forces acting on the automobile 41 can be measured by measuring the load acting on the base 63. Alternatively, the aerodynamic forces on the automobile 41 can be measured by summing the load of the four load cells 61 provided on each support pillar 59.

Note that the present invention is not limited to the above-described embodiments, and various modifications can be made without departing from the spirit of the present invention.

For example, although the moving belts 25 are employed in the mounting section 17 in this embodiment, portions excluding the supporting portions 29 may be constituted of the suction boxes 39 without employing the moving belts 25.

By doing so, for example, the procedure for carrying in the automobile 41 can be easily carried out. In addition, because the number of moving portions is reduced, preparatory operations, such as adjustment etc., can be simplified.

In addition, although the supporting portions 29 in this embodiment are constituted of the belt members 53 that are revolvingly driven, the structure of the supporting portions is not limited to this; for example, support may be provided by a plurality of rotating rollers.

Furthermore, although a closed-circuit type of wind tunnel 3 is employed, any type of wind tunnel may be employed, including an open-circuit type, etc.

The invention claimed is:

1. A test section for a wind-tunnel testing apparatus, comprising:
   a mounting section configured to mount a test object along an internal floor surface of the wind tunnel, tests on the test subject being capable of being conducted by applying an airflow blown in said wind tunnel to the test object mounted on said mounting section;
   an upstream-side suction portion including a slit that is disposed on a floor surface located on an upstream side of said mounting portion with respect to the airflow direction so as to extend in an intersecting direction intersecting the airflow direction, and being configured to suck in a portion of the airflow near said floor surface; and
   first and second lateral suction portions disposed at first and second sides of said mounting section, respectively, and being configured to suck in the incoming airflow flowing in from said first and second sides of said mounting section, respectively.

2. The test section for a wind-tunnel testing apparatus according to claim 1, wherein said mounting section comprises:
   a plurality of endless belts disposed with distances therebetween in the intersecting direction, said plurality of endless belts being capable of being revolvingly driven in a direction substantially perpendicular to the intersecting direction;
   suction portions disposed between adjacent endless belts, and being configured to suck in the airflow; and
   supporting portions installed in said suction portions disposed between said adjacent endless belts, and being configured to support ground contact portions of the test object.

3. The test section of a wind-tunnel testing apparatus according to claim 2, wherein said supporting portions are rotatable.

4. The test section of a wind-tunnel testing apparatus according to claim 2, wherein said supporting portions are constituted by revolvingly driven endless belts.

5. The test section of a wind-tunnel testing apparatus according to claim 2, wherein said supporting portions comprise a balance apparatus that measures a load acting on said supporting portions.

6. A wind-tunnel testing apparatus comprising:
   a test section according to claim 1;
   a blower that generates an airflow; and
   a wind tunnel that guides the airflow to said test section.

* * * * *